United States Patent [19]

Maines

[11] Patent Number: 5,794,635
[45] Date of Patent: Aug. 18, 1998

[54] EYE GLASS CLEANING MACHINE

[76] Inventor: Kenneth E. Maines, 40 Hidden Vale C1 NW, Calgary, Canada, T3A 5C8

[21] Appl. No.: 790,450

[22] Filed: Jan. 29, 1997

[51] Int. Cl.$^6$ ........................................... B08B 3/02
[52] U.S. Cl. ..................... 134/95.3; 134/95.1; 134/155; 134/199; 134/201
[58] Field of Search ................. 134/95.3, 94.1, 134/95.1, 95.2, 102.1, 102.2, 102.3, 103.1, 201, 155, 186, 199

[56] References Cited

U.S. PATENT DOCUMENTS

| | | | |
|---|---|---|---|
| 3,259,139 | 7/1966 | Bell et al. | 134/199 |
| 4,157,922 | 6/1979 | Luik | 134/102.1 |
| 4,406,297 | 9/1983 | Walton | 134/102.3 |
| 4,409,999 | 10/1983 | Pedziwiatr | 134/95.2 |
| 4,582,076 | 4/1986 | Prat | 134/95.1 |
| 4,986,290 | 1/1991 | Oguma et al. | 134/901 |
| 5,143,101 | 9/1992 | Mor | 134/901 |
| 5,335,394 | 8/1994 | Cunningham, Jr. et al. | 134/135 |
| 5,347,674 | 9/1994 | Gabbert | 134/901 |

FOREIGN PATENT DOCUMENTS

| | | | |
|---|---|---|---|
| 4209624 | 9/1993 | Germany | 134/184 |
| 6-130334 | 5/1994 | Japan | 134/901 |
| 2042208 | 9/1980 | United Kingdom | 134/102.2 |

*Primary Examiner*—Frankie L. Stinson
*Attorney, Agent, or Firm*—David S. Thompson

[57] ABSTRACT

Two similar representative versions of an eye glass cleaning machine constructed in accordance with the principles of the invention are seen. In each version an enclosure providing a base having a bowl forming an eye glass cavity supports a pair of eye glasses to be cleaned by means of adjustable clips. In the first version of the invention, a heated cleaning fluid and waste fluid tank and a rinse water tank are filled by a two-way drain valve. In the second version, a heated cleaning fluid tank, a rinse water tank and a waste tank are filled by a three-way drain valve. In both versions of the invention, an electronics card controls the operation of a pump, air pump and a solenoid valve, which determines from which tank (cleaning fluid or rinse water) the fluid supplied to spray nozzles will be taken. The electronics also controls heating elements in the cleaning fluid and rinse water tanks. The adjustable two-way or three-way drain valve allows the user to rotate a valve plate having a hole until it coincides with the appropriate fill port.

6 Claims, 3 Drawing Sheets

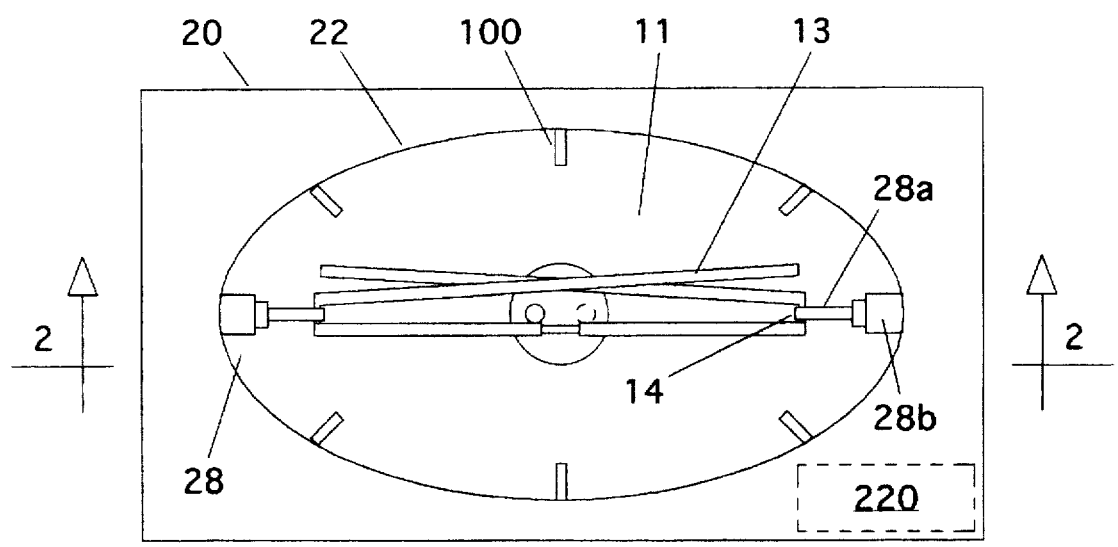
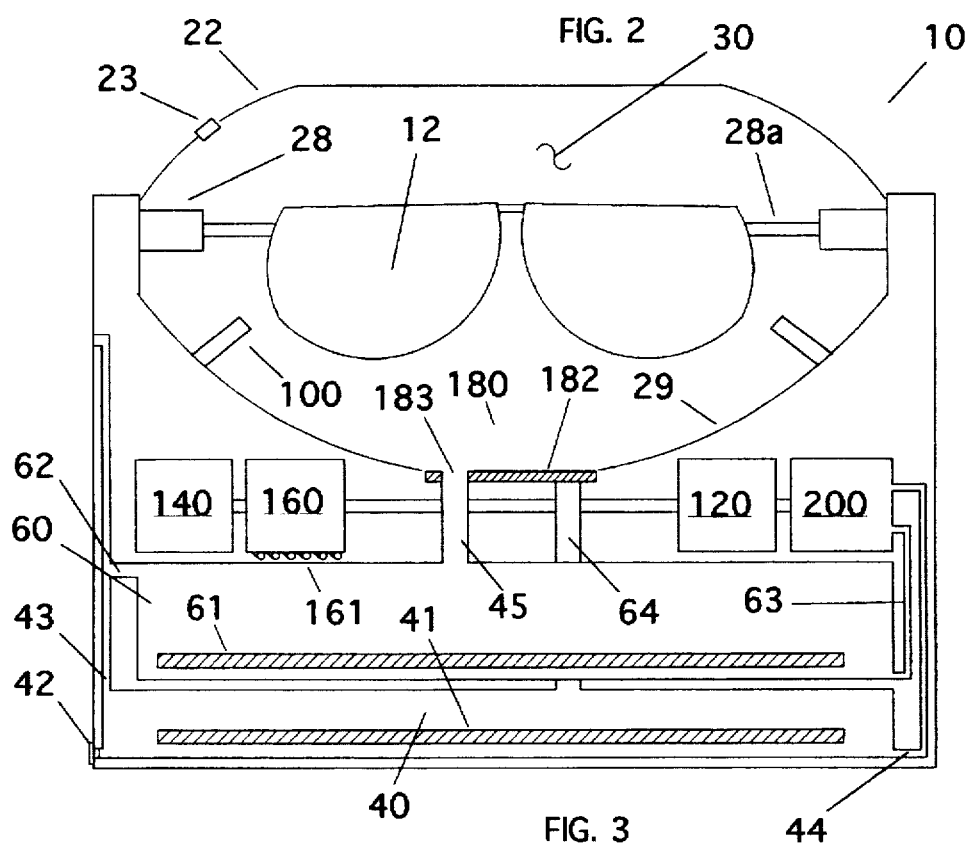
FIG. 2
FIG. 3

5,794,635

EYE GLASS CLEANING MACHINE

CROSS-REFERENCES

There are no applications related to this application filed in this or any foreign country.

BACKGROUND

Eye glass cleaning machines are known to use fluids and hot air to clean and dry a pair of eye glasses. However, many such machines are not adapted for home use, since they are too costly, too bulky or otherwise unsuited for mass-production for the home market.

A common problem of known eye glass cleaning machines is a failure to adequately facilitate the addition and removal of the fluids needed to clean the eye glasses. In some machines, a funnel or similar tool is required to pour cleaner into a port having a threaded cap closure. Separate and easily assessable storage tanks for cleaning, rinsing and waste fluids are rare or unknown. In many machines the premixing of fluids is required, since separate tanks are not provided and the machine does not provide the necessary means to accomplish the task in an automated manner.

A common problem found in most if not all known machines is that of water spotting on the eye glass lenses due to trace minerals present in water. In some geographic areas this can be particularly troublesome. A related problem concerns the tendency of water jets to foul and plug due to mineral deposits.

A further problem common to many known machines is that only the lenses of the eye glasses are washed, and the arms are not cleaned. In many machines where the arms are cleaned the machine is quite bulky, and not suited for home use.

A still further problem common to several machines is the dependence on brushes or other frictional means to clean the lenses which may over time cause damage.

SUMMARY

The present invention is directed to an apparatus that solves the above problems. A novel eye glass cleaning machine provides structures consistent with the need for better and more convenient fluid handling, less susceptibility of eye glass lens spotting due to water deposits, and greater ability of the machine to self-clean.

The eye glass cleaning machine of a version of the present invention provides some or all of the following structures:

(a) An enclosure provides a base having a oval bowl beneath a transparent oval top. Eye glasses are carried above a bowl and beneath the oval top by the pair of adjustable clips which secure the hinge portions of the eye glass frames. Spray nozzles, located at intervals about the bowl, are suitable for spraying either cleaning fluid, rinse water or drying air at the glasses.

(b) Separate soap, water and waste tanks are carried within the enclosure below the bowl, and may be filled by pouring liquid into the bowl. A drain valve carried at the base of the bowl directs the fluid draining from the bowl into one of the three tanks. Heating elements in the water and cleaning fluid tanks allow the contents of these tanks to be heated.

(c) A fluid pump, having input from a solenoid valve which selects either the cleaning fluid or water rinse tanks, applies pressurized liquid to the nozzle elements.

(d) An air pump provides pressurized air to the nozzles, during a drying cycle.

(e) Electronics, including a microcontroller and switching devices, provides control over the heating elements, an operational indicator LED, the fluid pump and the air-pump. The electronics controls various cycles. During a warming cycle fluids in the tanks are warmed, prior to use. A wash cycle activates the pump, thereby delivering the cleaning fluid through the nozzles and onto the eye glasses. A rinse cycle activates the solenoid valve, thereby causing rinse water rather than cleaning fluid to be delivered to the nozzles. A drying cycle turns off the fluid pump and turns on the air pump, delivering drying air to the nozzles which dries the lenses in a spot-free manner.

It is therefore a primary advantage of the present invention to provide a novel eye glass cleaning machine that eliminates the need to mix fluids prior to pouring them into the machine.

Another advantage of the present invention is to provide a novel eye glass cleaning machine that is compact, inexpensive, does not use frictional brushes and that washes both the lenses and the arms of the glasses.

Another advantage of the present invention is to provide a novel eye glass cleaning machine that provides a novel two- or three-way drain valve that allows easy input of fluids into the fluid tanks of the machine.

A still further advantage of the present invention is to provide a novel eye glass cleaning machine that reduces the problem of water spotting of the lenses and water deposit and soap build up inside the cleaning machine.

DRAWINGS

These and other features, aspects, and advantages of the present invention will become better understood with regard to the following description, appended claims, and accompanying drawings where:

FIG. 2 is a top orthographic view of the eye glass cleaning machine of FIG. 1, having a pair of eye glasses installed;

FIG. 3 is a side cross-sectional view of a first version of the invention, having a rinse water tank and combined function cleaning fluid and waste containment tank;

DESCRIPTION

Figure 4:
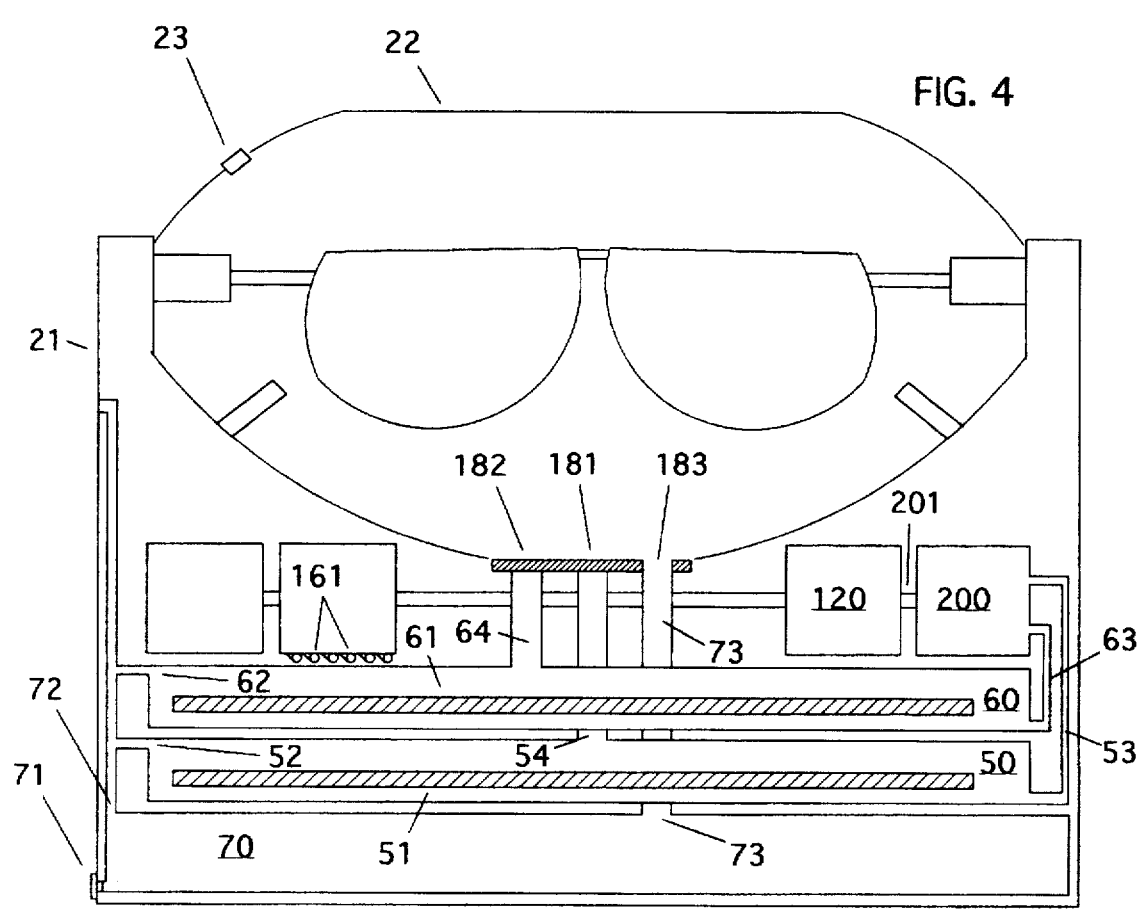
FIG. 4 is a side cross-sectional view of a second version of the invention having separate cleaning fluid, rinse water and waste tanks.

Referring in particular to the cross-sectional views of FIGS. 3 and 4, two similar representative versions of an eye glass cleaning machine 10 constructed in accordance with the principles of the invention are seen. The invention resides not in any one of these features per se, but rather in the particular combination of all of them herein disclosed and claimed and it is distinguished from the prior art in this particular combination of all of its structures for the functions specified.

In each version of the invention an enclosure 20 providing a base 21 having a bowl 29 forming an eye glass cavity 30 supports a pair of eye glasses 11 to be cleaned by means of adjustable clips 28. In the first version, seen in FIG. 3, a heated cleaning fluid and waste fluid tank 40 and a rinse water tank 60 are filled by a two-way drain valve 180 at the base of the bowl 29. In the second version, seen in FIG. 4, a heated cleaning fluid tank 50, a heated rinse water tank 60 and a waste tank 70 are filled by a three-way drain valve 181. In both versions of the invention, an electronics card 220 controls the operation of a fluid pump 120, air pump 140, a solenoid valve 200, which determines from which tank (cleaning fluid or rinse water) the fluid supplied to spray nozzles 100 will be taken, and other functions.

Figure 1:
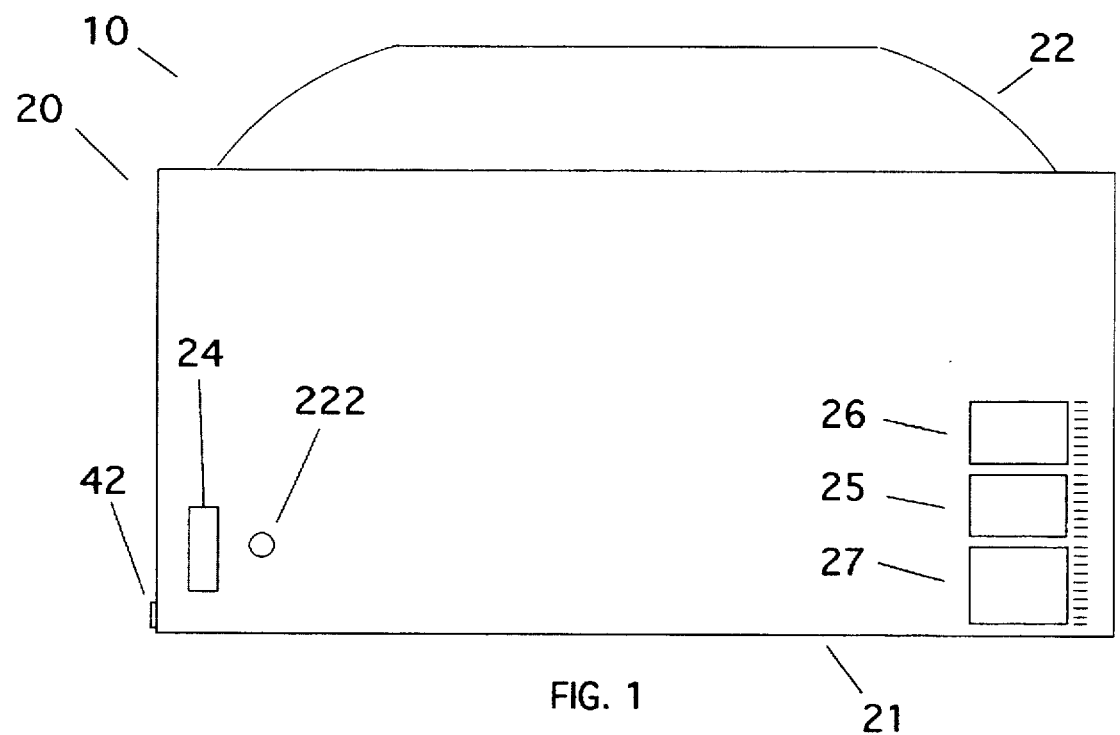
FIG. 1 is a side orthographic view of a version of the eye glass cleaning machine of the invention, showing the transparent oval top, the fluid level indicators, the switch, the operation light and the waste tank drain plug.

Referring in particular to FIGS. 1, 3 and 4, the enclosure 20 is seen. The enclosure provides a base 21 supporting an oval top 22. In the preferred version of the invention, the base and oval top are made of plastic, and the top is transparent, thereby allowing the user to view the cleaning process. An air vent 23 in the oval top allows air to be exhausted during the drying cycle, as will be discussed below. A switch opening 24 allows the user to activate the on-off switch, thereby starting the cleaning cycle. Cleaning fluid, rinse water and waste tank gauges 25, 26, 27 provide a transparent view port adjacent to graduated indicators that allow the user to view the transparent tanks directly to determine their contents.

Adjustable clips 28 allow the user to mount and support a pair of glasses within an eye glass cavity 30 over the bowl 29. The clips 28 are typically of an alligator type that grip the hinges 14 of the eye glasses with arms 13 folded, as seen in FIG. 2. A jaw 28a is supported by the base 28b. The jaw may be rotated within the base and extended or retracted somewhat to accommodate differing eye glass sizes.

In the first version of the invention, seen in FIG. 3, a cleaning fluid and waste containment tank 40 contains cleaning fluid at the beginning of the cleaning cycle, and a combination of cleaning fluid, dirt and rinse water at the end of the cleaning cycle. The cleaning fluid/waste tank 40 provides an electric heating element 41 that is suitable for submersion in fluid. A drain plug 42 allows waste fluid to be drained after the cycle is over. A dispensing tube 44 draws fluid from the bottom of the tank 40, and carries the fluid to an input of the solenoid valve 200. Air enters or leaves through air vent 43, to relieve pressure, as fluid enters or leaves the tank. A fill port 45 is in communication with the two-way drain valve 180. As a result, liquid in the bowl 29 will drain into the tank 40, if the valve 180 is opened. The cleaning fluid is therefore filled in this manner, and waste resulting from spraying the eye glasses returns in this manner.

The tanks 40, 50, 60, 70 are typically made of transparent or semi-transparent plastic, so that the fluid level may be determined by observation of the tank through gauge 25.

A rinse fluid or water tank 60 is seen in both FIGS. 3 and 4, and is common to both versions of the invention. In the preferred embodiment, the rinse fluid used is water, but could alternatively be alcohol or some other fluid. The water tank 60 provides a heating element 61 similar to the heating element 41 discussed above. A dispensing tube 63 draws fluid from the bottom of the tank 60, and carries the fluid to an input of the solenoid valve 200. The water tank also provides an air vent 62, which allows air to enter the tank as rinse water is removed. A fill port 64 is in communication with the two-way drain valve 180 or the three-way drain valve 181, and liquid in the bowl 29 will drain into the tank 60, if the valve 180 is opened. The water tank is therefore filled in this manner.

A solenoid valve 200 provides two inputs and a single fluid output. In a first version of the invention, the solenoid valve has input from the dispensing tube 44 of the combined cleaning fluid and waste tank 40 and from the dispensing tube 63 of the rinse fluid tank 60. In a second version of the invention, the solenoid valve has input from the dispensing tube 53 of the cleaning fluid tank 50 and the dispensing tube 63 of the rinse fluid tank 60. The valve is movable between two settings, or states, in which either of the two inputs is in communication with the output. The output tube 201 is typically connected to the fluid pump 120. The setting of the valve is controlled by the electronics, as will be seen, which provides an electrical input to the valve 200.

A fluid pump 120 pumps fluid from the solenoid valve 200 to a distribution box 160. In the preferred embodiment of the invention, the pump 120 is similar in construction to the pumps used in WATER PIC® type dental cleaning tools, but may be larger in capacity to enable it to supply pressurized fluid to a distribution box 160, from which six spray nozzles 100 may be supplied simultaneously.

The distribution box 160 functions to eliminate the tendency of nozzles nearer the pump from having greater pressure and therefore having a more powerful spray than nozzles further from the pump. In the preferred embodiment, the input to the distribution box is from the fluid pump 120 and the air pump 140, and separate output tubes 161 from the distribution box connect each of the nozzles 100. Typically, the output tubes 161 exit from the bottom of the distribution box, so that air forced into the distribution box by the air pump will flush any fluid out. The distribution box is typically centrally located within the enclosure, and is formed of an air-tight construction.

An air pump 140 forces ambient air into the distribution box 160, where it exits through output tubes 161 and nozzles 100. Air speeds the drying process in part by blowing water from the lenses by force, thereby helping to eliminate spotting by removing the water containing trace minerals before the water has a chance to evaporate. Additionally, the forced air tends to speed evaporative drying of small amounts of remaining water. As a result, in the preferred embodiment, the air exiting from air pump 140 is typically not heated, as this would result in a greater tendency for the water droplets to dry while on the lenses. After exiting from the nozzles, water-vapor carrying air may exit from air vent 23 on the oval top 22 of the enclosure 20. The movement of air through the distribution box 160 and nozzles 100 tends to remove water from those structures, thereby preventing water deposit buildup.

Figures 6A, 6B:
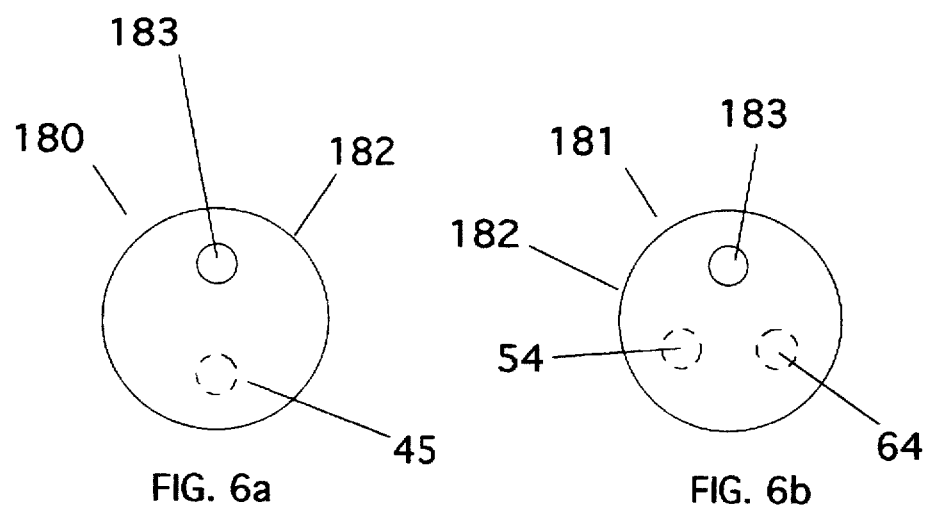
FIG. 6a is a top orthographic view of a two-way drain valve associated with the version of the invention of FIG. 3.
FIG. 6b is a top orthographic view of a three-way drain valve associated with the version of the invention of FIG. 4.

As seen in FIGS. 6a and 6b, a two-way drain valve 180 and a three-way drain valve 181 allows fluid to drain from the bowl 29 into any of the tanks 40, 50, 60, 70. The drain valves 180, 181 provide a rotatable plate valve 182 having a hole 183 that may be rotated to allow drainage into a fill port 45, 54, 64, 73. In the first version of the invention, having a combined cleaning fluid/waste tank 40 and a rinse water tank 60, only two fill ports would be connected to the base of the bowl 29, a waste/cleaning fluid fill port 45 and a rinse water input fill port 64. In the second version of the invention, three pipes would be provided, a water input fill port 64, a waste fill port 73 and a cleaning fluid fill port 54.

By rotating the valve plate 182, the hole 183 in the valve plate may be lined up with any fill port, or with no fill port.

When the hole 183 in the plate 182 is lined up with no fill port, the tanks are all sealed. This is advantageous when moving or storing the machine.

Figure 5:
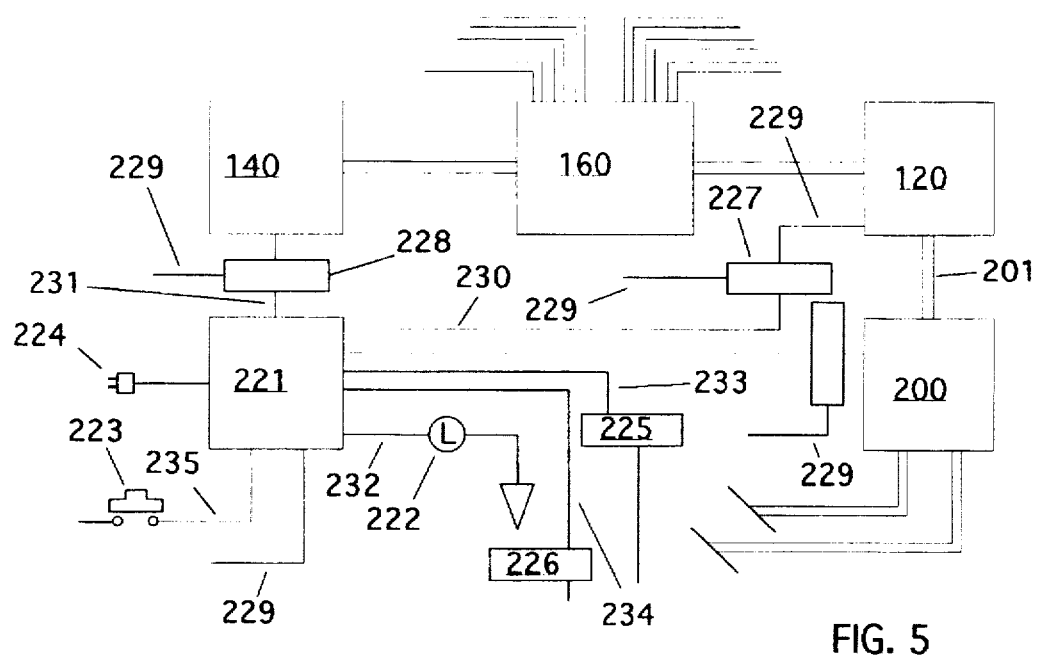
FIG. 5 is a somewhat diagrammatic view of a version of the electronics having a microcontroller chip having switching and timing functionality controlling an operation light, heating elements, a pump, a solenoid valve controlling the input to the pump and an air pump.

As seen in FIGS. 1 and 5, an electronics card 220 controls the functionality of the eye glass cleaning machine. An ac plug having an attached direct current power converter 224, of a type that is well-known and commercially available provides a direct current power line 236 to the unit. The current provided is typically low voltage dc current, which is consistent with the safe electrical practices.

A microcontroller 221 provides the timer and switching functionality required. A pushbutton activation switch 223 is connected to an input port line 235 of the microprocessor, and activates the cleaning cycle. An output line 230 from the microcontroller controls the switching device 227 for the pump 120. An output line 231 from the microcontroller controls the switching device 228 for the air pump 140. An output line 232 from the microcontroller controls the indicator LED 222. An output line 233 from the microcontroller controls the switching device 225 for the water heater element 61. An output line 234 from the microcontroller controls the switching device 226 for the cleaning fluid heating element 41, 51. The switching devices may be power transistors, TRIACS or relay type devices. When switched on, the switching device applies the dc voltage potential 229 to the connected device.

In the second version of the invention, a separate cleaning fluid tank 50 and waste tank 70 allows the eye glass cleaning machine to be used multiple times without adding additional cleaning fluid, since the waste fluid from the cleaning operation is not put into the cleaning fluid tank, but into a separate waste tank. As a result, a three-way drain valve 181 is used, as seen in FIG. 4. Fill ports 54, 73 are in communication with the three-way drain valve 181, and liquid in the bowl 29 will drain into the tanks 50 or 70, depending on the state of the valve 181. The cleaning fluid tank 50 is therefore filled in this manner. The cleaning fluid tank 50 provides a heating element 51 and an air vent 52. The waste tank 70 provides a drain plug 71 and an air vent 72. A dispensing tube 53 draws fluid from the bottom of the cleaning fluid tank 50, and carries the fluid to an input of the solenoid valve 200.

To use the eye glass cleaning machine of the invention, the eye glasses 11 are first attached to the adjustable clips 28. The jaw 28a of each clips is rotated about its base, as needed, and then attached to the hinges 14 of the arms 13 of the glasses.

The wash cycle is initiated by the activation switch 223 An optional delay cycle may initiate the wash cycle. Following the delay cycle, the microprocessor turns on the heating elements 41, 51, 61, depending of the version of the invention. The heating elements increase the temperature of the cleaning fluid and rinse water, which improves cleaning and drying efficiency. As seen in the circuit schematic of FIG. 3, the current required to activate the heating elements, pump and air pump is greater than what can be provided by the microcontroller; therefore the microcontroller activates a relay or other switching device which applies current to these devices. Following the heating cycle, the current to the heating elements is turned off. The microcontroller then activates the solenoid, causing the solenoid to cause the associated valve to direct fluid flow from the cleaning fluid tank 40, 50. The microcontroller then turns on the fluid pump 120, causing cleaning solution to flow from the cleaning fluid tank, through the solenoid valve, through the distribution box 160, through the spray nozzles 100 and onto the lenses 12 and other parts of the eye glasses 11. After a prescribed period, which may easily be programmed into the microcontroller, the pump is shut off, the state of the solenoid valve is reversed, connecting the rinse water tank 60 to the pump, and the pump turned on. This rinses the glasses and removes cleaning fluid from the distribution box and nozzles. After a further prescribed period the pump is again turned off by the microcontroller. The air pump 140 is then turned on. Air from the air pump is forced into the distribution box, where it forces out the water from the rinse cycle. Air then is expelled from the nozzles 100, causing it to blow-dry the eye glasses.

The previously described versions of the present invention have many advantages, including a primary advantage of providing a novel eye glass cleaning machine that eliminates the need to mix fluids prior to pouring them into the machine.

Another advantage of the present invention is to provide a novel eye glass cleaning machine that is compact, inexpensive, does not use frictional brushes and that washes both the lenses and the arms of the glasses.

Another advantage of the present invention is to provide a novel eye glass cleaning machine that provides a novel two- or three-way drain valve that allows easy input of fluids into the fluid tanks of the machine.

A still further advantage of the present invention is to provide a novel eye glass cleaning machine that reduces the problem of water spotting of the lenses and water deposit and soap build up inside the cleaning machine.

Although the present invention has been described in considerable detail and with reference to certain preferred versions, other versions are possible. For example, two pumps could be used, one for pumping cleaning fluid and one for pumping rinse water. The location of the pumps could also be altered, for example the pumps could be either before or after the solenoid valve. Similarly, two solenoid valves could be used, one regulating the cleaning fluid leaving the cleaning fluid tank and one regulating the water leaving the rinse water tank. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An eyeglass cleaning machine for cleaning a pair of eyeglass, comprising:
   (a) an enclosure, providing a base supporting a removable top, the base forming a bowl defining an eyeglass cavity;
   (b) a cleaning fluid tank, carried by the enclosure, having a first dispensing tube and having a fill port;
   (c) a rinse fluid tank, carried by the enclosure, having a second dispensing tube and having a fill port;
   (d) valve means, in communication with the first and second dispensing tubes, for regulating the flow of fluid through the first and second dispensing tubes;
   (e) fluid pump means, in communication with the valve means, for pumping fluid from either the cleaning fluid tank or the rinse fluid tank;

(f) at least four spray nozzles, carried by the enclosure and in communication with the fluid pump means, for spraying the pair of eyeglasses; and (g) drain valve means, carried by a lower portion of the bowl, for regulating the flow of fluid from the bowl into the rinse fluid tank and the cleaning fluid tank, the drain valve means in communication with the fill port of the cleaning fluid tank and the fill port of the rinse fluid tank, the drain valve means comprising a manually rotatable valve plate sized to block fluid passage through the fill ports associated with the cleaning fluid tank and the rinse fluid tank, the manually rotatable valve plate defining a hole sized for selective communication with one of the fill ports associated with the cleaning fluid tank and the rinse fluid tank.

2. The eyeglass cleaning machine of claim 1, further comprising:

(a) means for spray nozzle pressure equalization, comprising a distribution box, in communication with the fluid pump means and with the at least four spray nozzles.

3. The eyeglass cleaning machine of claim 1, further comprising:

(a) electronics means, in electrical communication with the fluid pump means and the valve means, for turning the fluid pump means on and off and for changing the state of the valve means.

4. The eyeglass cleaning machine of claim 1, further comprising:

(a) an air pump, in communication with the at least four spray nozzles, for blowing air through the at least four spray nozzles at the eyeglasses.

5. The eyeglass cleaning machine of claim 1, further comprising:

(a) a waste tank, carried by the enclosure, having a fill port adapted to allow waste to gravity-feed from the bowl through the drain valve and into the waste tank.

6. An eyeglass cleaning machine for cleaning a pair of eye glasses, comprising:

(A) an enclosure, providing a base supporting a removable top, the base forming a bowl defining an eyeglass cavity, the bowl having a manually operable drain valve carried in a lower portion of the bowl;

(B) a cleaning fluid tank, carried by the enclosure, having a first dispensing tube and having a vertically oriented fill port;

(C) a rinse fluid tank, carried by the enclosure, having a second dispensing tube and having a vertically oriented fill port;

(D) a waste tank, carried by the enclosure, having a vertically oriented fill port;

(E) valve means, in communication with the first and second dispensing tubes, for regulating the flow of fluid through the first and second dispensing tubes;

(F) fluid pump means, in communication with the valve means, for pumping fluid from either the cleaning fluid tank or the rinse fluid tank;

(G) air pump, in communication with the at least four spray nozzles, for blowing air through the at least four spray nozzles at the eyeglasses;

(H) a distribution box, in communication with the fluid pump means and with the at least four spray nozzles;

(I) at least four spray nozzles, carried by the enclosure and in communication with the fluid pump means, for spraying the pair of eyeglasses;

(J) electronics means, in electrical communication with the fluid pump means and the valve means, for turning the fluid pump means on and off and for changing the state of the valve means; and (K) drain valve means, carried by a lower portion of the bowl, for regulating the flow of fluid from the bowl into the rinse fluid tank, the waste tank and the cleaning fluid tank, the drain valve means in communication with the fill port of the cleaning fluid tank, the fill port of the rinse fluid tank, and the fill port of the waste tank, the drain valve means comprising a manually rotatable valve plate sized to block fluid passage through the fill ports associated with the rinse fluid tank, the waste tank and the cleaning fluid tank, the manually rotatable valve plate defining a hole sized for selective communication with one of the fill ports associated with the rinse fluid tank, the waste tank or the cleaning fluid tank.

* * * * *